H. L. SILVER.
DUST CAP.
APPLICATION FILED JULY 14, 1920.
1,365,859. Patented Jan. 18, 1921.
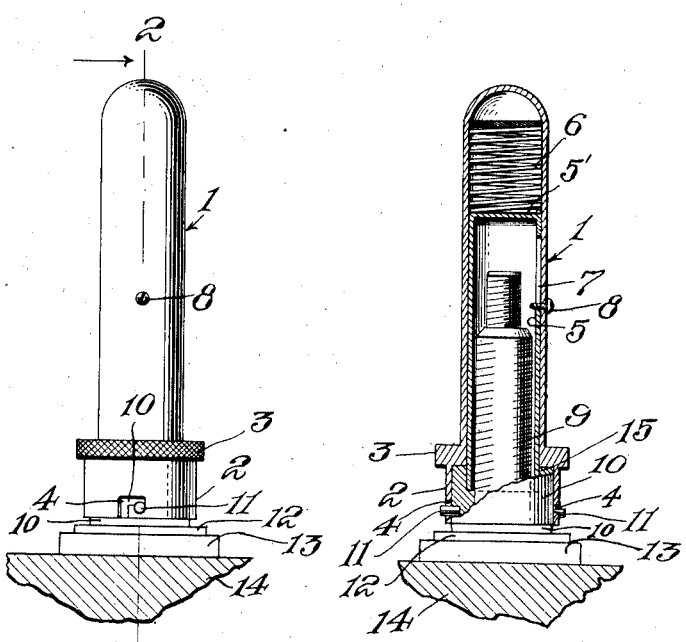
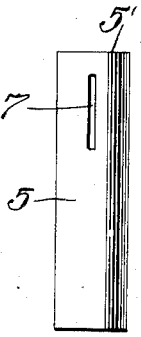
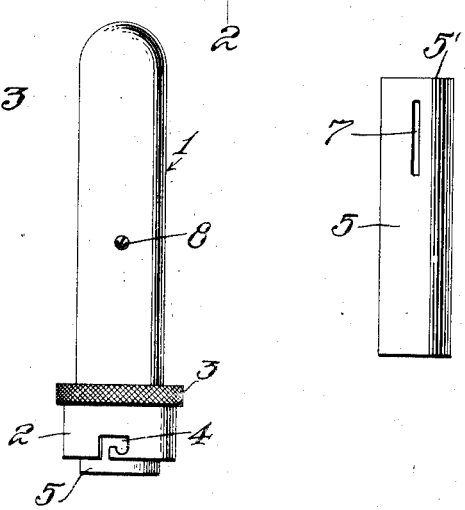
Inventor
H. L. Silver.
By Fenton B. Brock
Attorney

UNITED STATES PATENT OFFICE.

HERMAN L. SILVER, OF LOS ANGELES, CALIFORNIA.

DUST-CAP.

1,365,859. Specification of Letters Patent. Patented Jan. 18, 1921.

Application filed July 14, 1920. Serial No. 396,105.

*To all whom it may concern:*

Be it known that I, HERMAN L. SILVER, a citizen of the United States, residing at Los Angeles, in the county of Los Angeles and State of California, have invented certain new and useful Improvements in Dust-Caps, of which the following is a specification.

The present invention relates to improvements in dust caps for tire valves of pneumatic wheels, and is designed for quick action in attaching the cap to or detaching the cap from the valve stem, in combination with the locking nut of the valve stem.

By the utilization of the device of my invention the loss of time and tedious screwing and unscrewing of the locking nut on the stem usually accompanying the removal of the cap is avoided, and a neat appearance is given to the valve device.

An adequate covering for the valve stem is provided and said covering may be removed to give access to the valve stem for filling the tire without necessity of removing the locking nut.

The invention consists in certain novel combinations and arrangements between the cap and locking nut whereby the stem may with facility be separated from the nut or applied thereto, and when in place the cap is locked and rigidly held to the nut, as hereinafter described.

In the accompanying drawings I have illustrated one complete example of the physical embodiment of my invention constructed and arranged according to the best mode I have so far devised for the practical application of the principles of my invention.

Figure 1 is a view in elevation showing the dust cap in place.

Fig. 2 is a vertical sectional view of the device on line 2—2.

Fig. 3 is a view in elevation of the cap detached.

Fig. 4 is a view in elevation of the sleeve detached.

In the preferred form of my invention as illustrated in the drawings the metallic dust cap 1 is of cylindrical form with a closed rounded top and provided with an enlarged lower sleeve 2 and a knurled or milled annular shoulder or flange 3 to form a finger hold. Near the lower edge of the sleeve 2 are provided a pair of diametrically disposed bayonet slots 4—4. Within the cap is inclosed an inner cylindrical sleeve 5 and between the closed end 5' of this sleeve and the closed end of the cap is interposed a coiled spring 6 which tends to urge the sleeve or tube 5 toward the open end of the cap.

The inner sleeve is permitted to have a limited longitudinal movement within the cap that is guided and restricted by the coaction of a slot 7 in the sleeve and a screw 8 threaded through the cap and into the sleeve.

The cap, sleeve and invisible spring are thus held together as an independent structure, and when detached, the open end of the sleeve is projected below the open end of the cap as in Fig. 3.

For locking the threaded valve stem 9, I employ a nut 10 screwed thereon, and fashioned with a pair of diametrically arranged pins 11—11 that co-act in well known manner with the bayonet slots 4—4 of the cap sleeve 2 to lock the cap to the nut.

A base flange or ring 12 on the nut is turned into close contact with the gasket 13 on the felly of the wheel indicated at 14.

At its inner end the nut is counterbored at 15 and its threads are eliminated at this point to provide a seat for the reception of the lower end of the inner sleeve 5.

Thus when the cap is to be applied as a closure over the stem, the former is slipped over the stem and the projecting sleeve 5 is first seated in the counter bore of the nut. Then pressure is applied to the cap and it is forced toward the nut against the tension of the spring which bears against the seated sleeve 5. The bayonet connections are engaged by a twist of the cap in well known manner.

When in locked position on the nut, the cap is urged away from the nut by the spring and the pins are thus held in the notches of the bayonet slots, not only preventing rotary movement of the cap with relation to the nut, but also preventing longitudinal or axial movement of the cap on the stem, except when pressure is applied to the casing.

With the cap locked on the nut, the latter may be turned to left or right on the stem by the fingers which grasp the milled shoulder or flange 3 on the sleeve 2. The rigid cap and nut may thus be turned, bodily, off the stem.

For quick detachment of the cap, however, pressure is first applied to the cap, against the tension of the spring, until the pins are released from the bayonet-slot notches, then the cap is twisted to the left, slightly, and the spring forces the slotted cap sleeve past the pins, and the cap is released.

The sleeve 2 surrounding the nut and the sleeve 5 surrounding the stem within the nut thus form an effective joint for preventing ingress of dust or dirt to the stem.

What I claim is—

1. The combination with a stem of a dust cap and a counter bored nut, a spring and sleeve in the cap and said sleeve adapted to seat in the counter bored nut, and co-acting means on said cap and nut held in locked position by action of the spring.

2. The combination with a stem and nut thereon, of a cap adapted to fit over the nut and locking devices on said cap and nut, a relatively movable sleeve within the cap adapted to fit between the nut and stem, and a spring between the sleeve and cap for holding the cap locked on the nut.

3. The combination of a dust cap, a slotted sleeve therein, a retaining screw in the cap engaging the slotted sleeve and a spring interposed between the cap and sleeve, a nut, and co-acting means on said cap and nut held in locked position by the action of said spring.

HERMAN L. SILVER.